US012697632B2

(12) United States Patent
Yoshida et al.

(10) Patent No.: US 12,697,632 B2
(45) **Date of Patent: *Aug. 4, 2026**

(54) ELECTROSTATIC ATOMIZER

(71) Applicant: Carlisle Fluid Technologies, LLC, Scottsdale, AZ (US)

(72) Inventors: Osamu Yoshida, Tokyo (JP); Yoshiji Yokomizo, Nagoya (JP)

(73) Assignee: Carlisle Fluid Technologies, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,777

(22) Filed: Feb. 23, 2024

(65) Prior Publication Data

US 2024/0189844 A1 Jun. 13, 2024

Related U.S. Application Data

(63) Continuation of application No. 18/101,892, filed on Jan. 26, 2023, now abandoned, which is a continuation of application No. 17/420,456, filed as application No. PCT/US2021/014813 on Jan. 23, 2021, now Pat. No. 11,590,519.

(60) Provisional application No. 62/965,477, filed on Jan. 24, 2020.

(51) Int. Cl.

*B05B 5/053* (2006.01)
*B05B 5/04* (2006.01)

(52) U.S. Cl.

CPC ............ *B05B 5/053* (2013.01); *B05B 5/0403* (2013.01); *B05B 5/0533* (2013.01)

(58) Field of Classification Search

CPC ....... B05B 5/0255; B05B 5/032; B05B 5/025; B05B 5/03; B05B 5/04; B05B 5/031; B05B 5/053; B05B 5/0403; B05B 5/0533; B05B 13/0431; B05B 15/55; B05B 12/14; B05B 7/0012

See application file for complete search history.

(56) References Cited

U.S. PATENT DOCUMENTS 5,102,046 A * 4/1992 Diana .................. B05B 5/1625 239/3
7,056,387 B2 * 6/2006 van der Steur ......... B05B 15/55 239/691
11,590,519 B2 * 2/2023 Yoshida ................ B05B 5/0533
2006/0081729 A1 * 4/2006 Nagai ....................... B05B 5/04 239/690
2017/0001206 A1 * 1/2017 Yoshida ................ B05B 5/0403

* cited by examiner

*Primary Examiner* — Christopher R Dandridge
(74) *Attorney, Agent, or Firm* — Greenberg Traurig, LLP; Michael K. Dixon

(57) ABSTRACT

An electrostatic atomizer can include a paint supply path configured to supply paint to a paint discharge section; and a high voltage supply path configured to supply a high voltage to a discharge electrode, wherein the discharge electrode comprises a semi-conductive material, and wherein the high voltage supply path includes a high resistance near the discharge electrode, and is electrically segregated from the paint supply path.

7 Claims, 8 Drawing Sheets

14
10

ELECTROSTATIC ATOMIZER

CROSS-REFERENCES TO RELATED APPLICATIONS

The present application is a continuation and claims the benefit of the filing date of pending U.S. Ser. No. 18/101,892, filed 26 Jan. 2023, U.S. Ser. No. 17/420,456, filed Jul. 2, 2021, which is a continuation and claims the benefit of an application entitled, "Electrostatic Atomizer," U.S. provisional patent application Ser. No. 62/965,477, filed 24 Jan. 2020 and International Application PCT/US2021/014813, filed 23 Jan. 2021, assigned to the assignee of the present application, and herein incorporated by reference.

BACKGROUND

An electrostatic coating material can comprise solvent borne metallics. As an electrically charged bell cup approaches the ground while painting with a solvent borne metallic paint, a spark can be generated to the grounded object. This spark can be the result of the bridging phenomenon, where metallics in a paint align sufficiently in order to form a bridge between a charged bell cup and the grounded object, and thereby be the conductor for a spark. What is needed is a safe electrostatic atomizer wherein sparking is prevented, even when using metallic paint and/or in close proximity painting.

Provided is an electrostatic atomizer, specifically, an electrostatic atomizer wherein the high voltage supply path includes a high resistance near the discharge electrode and is electrically independent of the paint supply path.

SUMMARY

An electrostatic atomizer can include a paint supply path configured to supply paint to a paint discharge section; and a high voltage supply path configured to supply a high voltage to a discharge electrode, wherein the discharge electrode comprises a semi-conductive material, and wherein the high voltage supply path includes a high resistance near the discharge electrode, and is electrically segregated from the paint supply path. This electrostatic atomizer can prevent the bridging phenomenon, even in close proximity painting with paints comprising metallic particles.

DETAILED DESCRIPTION

Figure 1:
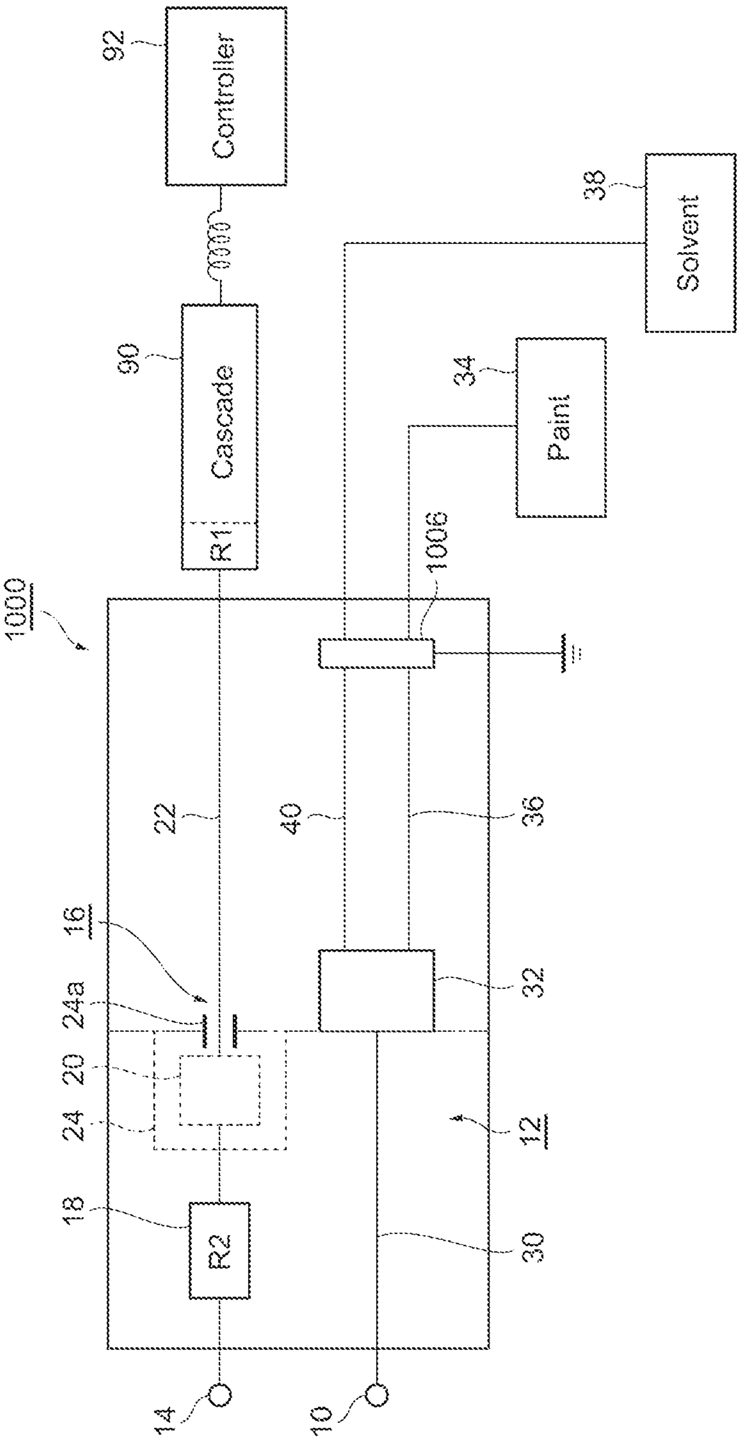
FIG. 1 is an example, non-limiting view of an electrostatic atomizer of the embodiments described herein.

Reference will now be made in detail to the embodiments consistent with the invention, examples of which are illustrated in the accompanying drawings. Wherever possible, the same reference numerals used throughout the drawings refer to the same or like parts.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art. As will be appreciated by one skilled in the art, aspects of the claimed subject matter may be embodied as an apparatus, system, or method. Accordingly, aspects of the claimed subject matter may take the form of an entirely hardware embodiment or method embodiment.

FIG. 1 is an example, non-limiting view of an electrostatic atomizer (1000) of the embodiments described herein. As shown in FIG. 1, the high voltage cascade (90) can be located within the electrostatic atomizer 100.

According to the electrostatic atomizer of FIG. 1, an electrostatic atomizer (1000) can comprise a paint supply path (12) configured to supply paint to a paint discharge section (10); and a high voltage supply path (16) configured to supply a high voltage to a discharge electrode (14), wherein the discharge electrode (14) comprises a semi-conductive material, and wherein the high voltage supply path (16) includes a high resistance (18) near the discharge electrode (14), and is electrically segregated from the paint supply path (12). According to certain embodiments, the electrostatic atomizer (1000) can provide that the paint supply path (12) comprises an electrically insulating material. In some embodiments the electrostatic atomizer (1000) can provide that the discharge electrode (14) consists of a semi-conductive material, and the paint supply path consists of an electrically insulating material. In certain embodiments, the electrostatic atomizer (1000) can provide that the high voltage supply path (16) includes a metal part (20) on an upstream side of the high resistance (18), and wherein the metal part (20) does not include a paint supply system part (32) forming a part of the paint supply path (12). According to some embodiments, the electrostatic atomizer (1000) according to can provide that the paint supply path (12) includes a feed tube (30) connected to the paint discharge section (10), and wherein the feed tube (30) is made of an electrically insulating material. In some embodiments the electrostatic atomizer (1000) is configured such that the electrostatic atomizer (1000) is a rotary atomizing type electrostatic atomizer (1000), wherein the discharge electrode (14) is composed of a rotary atomizing head (1004) which is connected to an output shaft (1010) of an air motor (20) configured to drive the rotary atomizing head, and wherein the rotary atomizing head (1004) consists of a semi-conductive resin material. The electrostatic atomizer (1000) can provide that the air motor (20) is made of metal and constitutes a part of the high-voltage supply path (16). In some embodiments, the electrostatic atomizer (1000) can provide that the output shaft (1010) of the air motor (20) is made of an electrically insulating material and is hollow, and wherein the feed tube (30) is coaxially arranged in the hollow output shaft (1010). In certain embodiments, the electrostatic atomizer (1000) can be configured such that the paint supply path (12) includes a manifold (32) communicated with the feed tube (30), wherein a paint supply pipe (36) communicated with a paint source (34) and a solvent supply pipe (40) communicated with a solvent source (38) are connected to the manifold (32), and wherein the paint supply pipe (36) and the solvent supply pipe (40) are grounded through a bracket (1006). In some embodiments, the electrostatic atomizer (1000) can be configured such that the manifold (32) consists of an electrically insulating material in some embodiments, the electrostatic atomizer (1000) can be arranged such that the paint supply pipe (36) and the solvent supply pipe (40) consist of an electrically insulating material. According to certain embodiments, the electrostatic atomizer (1000) can be configured such that the paint supply path (12) consists of an electrically insulating material. In some embodiments, electrostatic atomizer (1000) can provide that the high resistance (18) is supported by the hollow output shaft (1010). The electrostatic atomizer (1000) can further include an electrically insulating motor holder (24) for supporting the air motor (20) and having a hole for receiving a high-voltage cable (1002) forming a part of the high voltage supply path (16), and a cylindrical and electrically insulating member provided at an entrance of the hole of the motor holder (24), wherein the motor holder (24) has a cylindrical and electrically insulating member (24 *a*) at an entrance of a hole for receiving a high-voltage cable (1002), wherein the hole forms a portion of the high voltage supply path (16). In some embodiments, the electrostatic atomizer (1000) can be configured such that the high resistance (18) has a resistance value (R2) of 120 MW to 180 MW.

Figure 2:
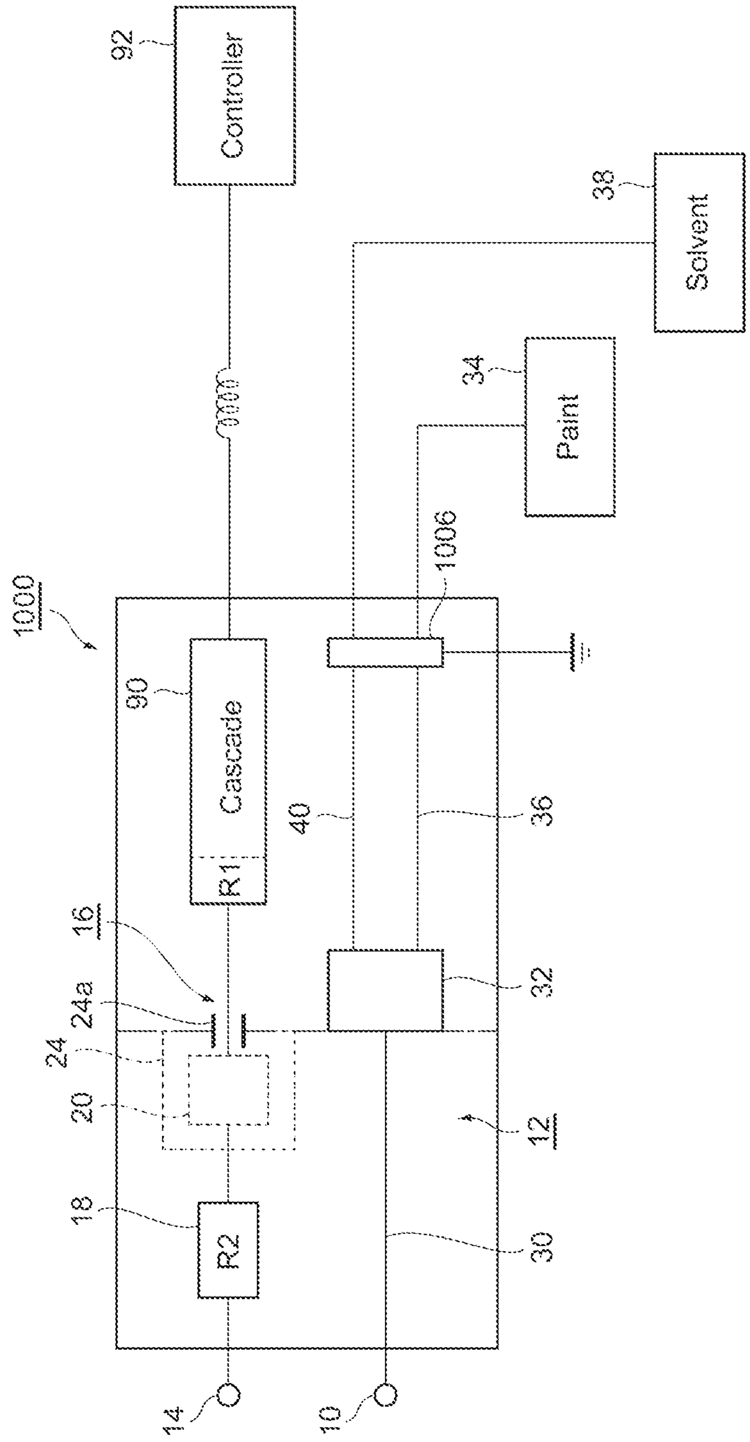
FIG. 2 is an example, non-limiting view of an electrostatic atomizer of the embodiments described herein.

FIG. 2 is an example, non-limiting view of an electrostatic atomizer (1000) of the embodiments described herein. As shown in FIG. 2, the high voltage cascade (90) can be located within the electrostatic atomizer 110. In some embodiments, the high voltage cascade comprises a generator. As used herein, high voltage can be at least 60 kV. In some embodiments, high voltage can be at least 80 kV. In some embodiments, high voltage can be as high as 130 kV. In some embodiments, high voltage can range from about 60 kV to about 120 kV.

According to the electrostatic atomizer of FIG. 2, the electrostatic atomizer (1000) can comprise a paint supply path (12) configured to supply paint to a paint discharge section (10); and a high voltage supply path (16) configured to supply a high voltage to a discharge electrode (14), wherein the discharge electrode (14) comprises a semi-conductive material, and wherein the high voltage supply path (16) includes a high resistance (18) near the discharge electrode (14), and is electrically segregated from the paint supply path (12). According to certain embodiments, the electrostatic atomizer (1000) can provide that the paint supply path (12) comprises an electrically insulating material. In some embodiments, the cascade 90 can incorporate a resistance R1. The high voltage generated by the cascade (90) can be supplied to the multiple electrostatic coating devices (1000). The first resistance value R1 of the cascade is typically at least 60 MW, and can be between 80 MW and 100 MW. In some embodiments the electrostatic atomizer (1000) can provide that the discharge electrode (14) consists of a semi-conductive material, and the paint supply path consists of an electrically insulating material. In certain embodiments, the electrostatic atomizer (1000) can provide that the high voltage supply path (16) includes a metal part (20) on an upstream side of the high resistance (18), and wherein the metal part (20) does not include a paint supply system part (32) forming a part of the paint supply path (12). According to some embodiments, the electrostatic atomizer (1000) according to can provide that the paint supply path (12) includes a feed tube (30) connected to the paint discharge section (10), and wherein the feed tube (30) is made of an electrically insulating material. In some embodiments the electrostatic atomizer (1000) is configured such that the electrostatic atomizer (1000) is a rotary atomizing type electrostatic atomizer (1000), wherein the discharge electrode (14) is composed of a rotary atomizing head (1004) which is connected to an output shaft (1010) of an air motor (20) configured to drive the rotary atomizing head, and wherein the rotary atomizing head (1004) consists of a semi-conductive resin material. The electrostatic atomizer (1000) can provide that the air motor (20) is made of metal and constitutes a part of the high-voltage supply path (16). In some embodiments, the electrostatic atomizer (1000) can provide that the output shaft (1010) of the air motor (20) is made of an electrically insulating material and is hollow, and wherein the feed tube (30) is coaxially arranged in the hollow output shaft (1010). In certain embodiments, the electrostatic atomizer (1000) can be configured such that the paint supply path (12) includes a manifold (32) communicated with the feed tube (30), wherein a paint supply pipe (36) communicated with a paint source (34) and a solvent supply pipe (40) communicated with a solvent source (38) are connected to the manifold (32), and wherein the paint supply pipe (36) and the solvent supply pipe (40) are grounded through a bracket (1006). In some embodiments, the electrostatic atomizer (1000) can be configured such that the manifold (32) consists of an electrically insulating material. In some embodiments, the electrostatic atomizer (1000) can be arranged such that the paint supply pipe (36) and the solvent supply pipe (40) consist of an electrically insulating material. According to certain embodiments, the electrostatic atomizer (1000) can be configured such that the paint supply path (12) consists of an electrically insulating material. In some embodiments, electrostatic atomizer (1000) can provide that the high resistance (18) is supported by the hollow output shaft (1010). The electrostatic atomizer (1000) can further include an electrically insulating motor holder (24) for supporting the air motor (20) and having a hole for receiving a high-voltage cable (1002) forming a part of the high voltage supply path (16), and a cylindrical and electrically insulating member provided at an entrance of the hole of the motor holder (24), wherein the motor holder (24) has a cylindrical and electrically insulating member (24 *a*) at an entrance of a hole for receiving a high-voltage cable (1002), wherein the hole forms a portion of the high voltage supply path (16). In some embodiments, the electrostatic atomizer (1000) can be configured such that the high resistance (18) has a resistance value (R2) of 120 MW to 180 MW.

Figure 3:
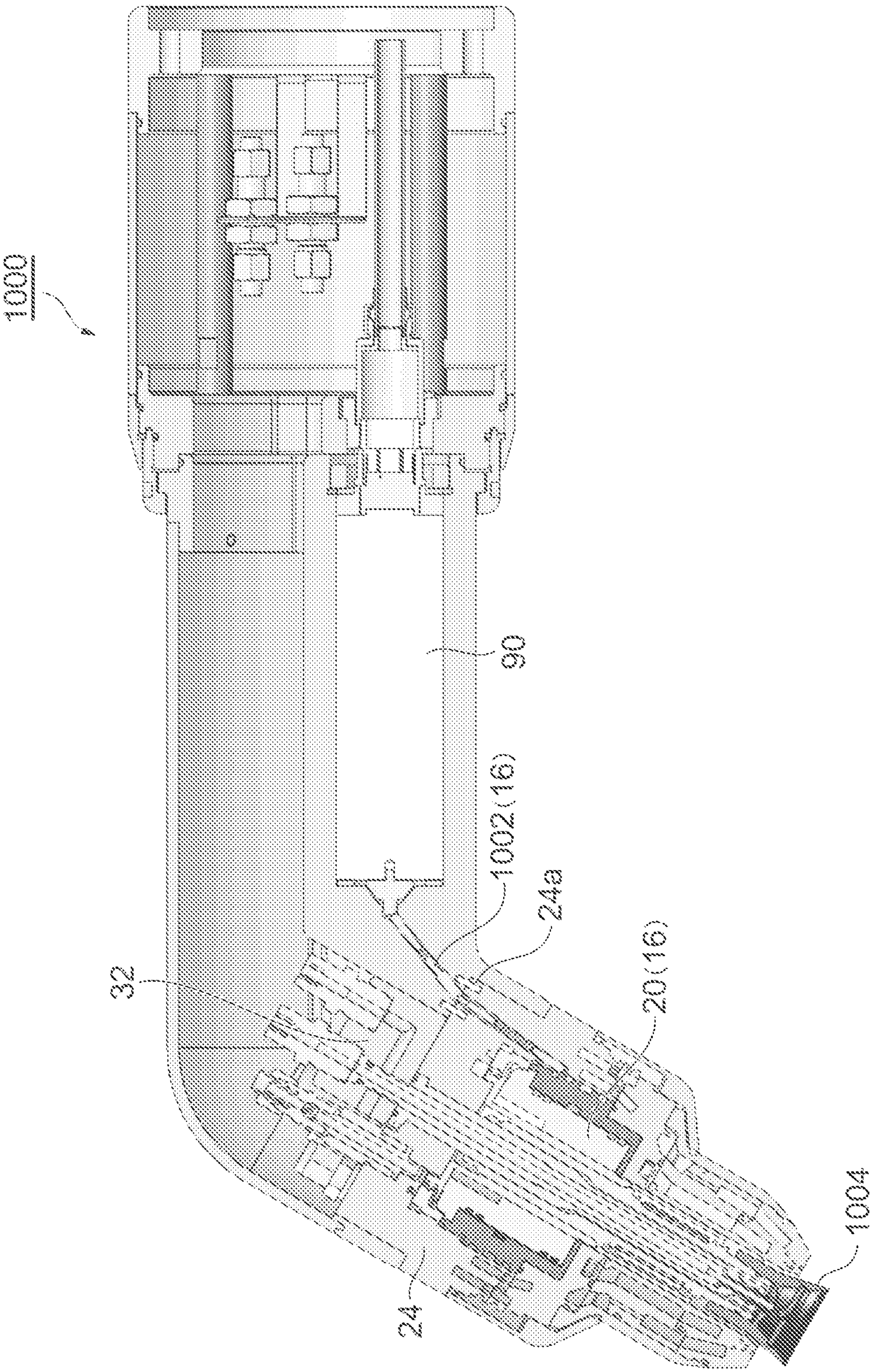
FIG. 3 is an example, non-limiting view of an electrostatic atomizer of the embodiments described herein.

FIG. 3 is an example, non-limiting view of an electrostatic atomizer (1000) of the embodiments described herein. As shown in FIG. 3, the paint supply path (12) can be a polytetrafluoroethylene tube. Further, the solvent supply pipe (40) can be a polytetrafluoroethylene tube.

According to the electrostatic atomizer of FIG. 3, an electrostatic atomizer (1000) can comprise a paint supply path (12) configured to supply paint to a paint discharge section (10); and a high voltage supply path (16) configured to supply a high voltage to a discharge electrode (14), wherein the discharge electrode (14) comprises a semi-conductive material, and wherein the high voltage supply path (16) includes a high resistance (18) near the discharge electrode (14), and is electrically segregated from the paint supply path (12). According to certain embodiments, the electrostatic atomizer (1000) can provide that the paint supply path (12) comprises an electrically insulating material. In some embodiments the electrostatic atomizer (1000)

can provide that the discharge electrode (14) consists of a semi-conductive material, and the paint supply path consists of an electrically insulating material. In certain embodiments, the electrostatic atomizer (1000) can provide that the high voltage supply path (16) includes a metal part (20) on an upstream side of the high resistance (18), and wherein the metal part (20) does not include a paint supply system part (32) forming a part of the paint supply path (12). According to some embodiments, the electrostatic atomizer (1000) according to can provide that the paint supply path (12) includes a feed tube (30) connected to the paint discharge section (10), and wherein the feed tube (30) is made of an electrically insulating material. In some embodiments the electrostatic atomizer (1000) is configured such that the electrostatic atomizer (1000) is a rotary atomizing type electrostatic atomizer (1000), wherein the discharge electrode (14) is composed of a rotary atomizing head (1004) which is connected to an output shaft (1010) of an air motor (20) configured to drive the rotary atomizing head, and wherein the rotary atomizing head (1004) consists of a semi-conductive resin material. The electrostatic atomizer (1000) can provide that the air motor (20) is made of metal and constitutes a part of the high-voltage supply path (16). In some embodiments, the electrostatic atomizer (1000) can provide that the output shaft (1010) of the air motor (20) is made of an electrically insulating material and is hollow, and wherein the feed tube (30) is coaxially arranged in the hollow output shaft (1010). In certain embodiments, the electrostatic atomizer (1000) can be configured such that the paint supply path (12) includes a manifold (32) communicated with the feed tube (30), wherein a paint supply pipe (36) communicated with a paint source (34) and a solvent supply pipe (40) communicated with a solvent source (38) are connected to the manifold (32), and wherein the paint supply pipe (36) and the solvent supply pipe (40) are grounded through a bracket (1006). In some embodiments, the electrostatic atomizer (1000) can be configured such that the manifold (32) consists of an electrically insulating material. In some embodiments, the electrostatic atomizer (1000) can be arranged such that the paint supply pipe (36) and the solvent supply pipe (40) consist of an electrically insulating material. According to certain embodiments, the electrostatic atomizer (1000) can be configured such that the paint supply path (12) consists of an electrically insulating material. In some embodiments, electrostatic atomizer (1000) can provide that the high resistance (18) is supported by the hollow output shaft (1010). The electrostatic atomizer (1000) can further include an electrically insulating motor holder (24) for supporting the air motor (20) and having a hole for receiving a high-voltage cable (1002) forming a part of the high voltage supply path (16), and a cylindrical and electrically insulating member provided at an entrance of the hole of the motor holder (24), wherein the motor holder (24) has a cylindrical and electrically insulating member (24 *a*) at an entrance of a hole for receiving a high-voltage cable (1002), wherein the hole forms a portion of the high voltage supply path (16). In some embodiments, the electrostatic atomizer (1000) can be configured such that the high resistance (18) has a resistance value (R2) of 120 MW to 180 MW.

Figure 4:
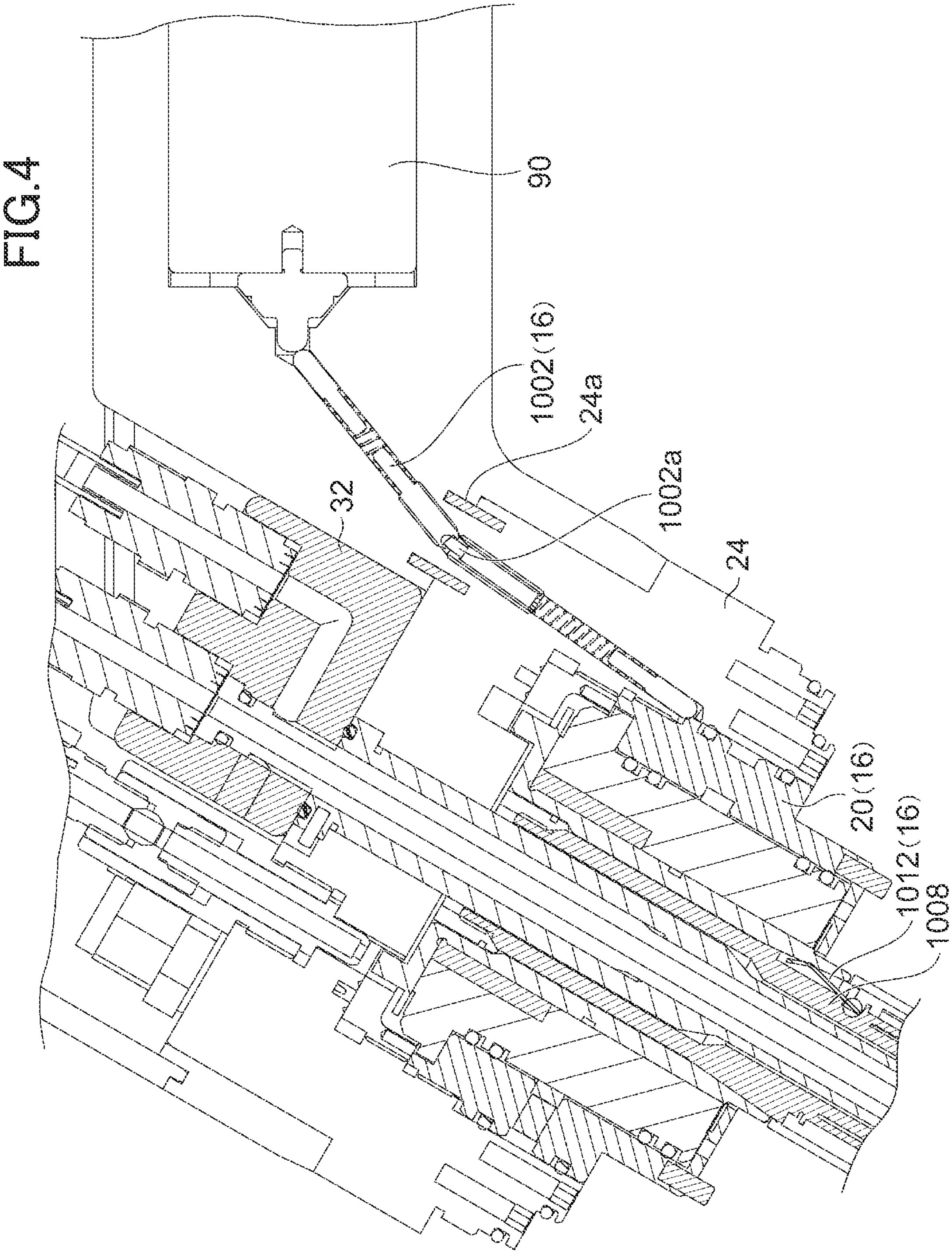
FIG. 4 is an example, non-limiting view of a portion of an electrostatic atomizer of the embodiments described herein.

FIG. 4 is an example, non-limiting view of a portion of an electrostatic atomizer of the embodiments described herein. As shown in FIG. 4, a contact (1002*a*) of the high voltage cable (1002) can be held under pressure by a spring. An electrostatic atomizer (1000) can comprise a paint supply path (12) configured to supply paint to a paint discharge section (10), and a high voltage supply path (16) configured to supply a high voltage to a discharge electrode (14), wherein the discharge electrode (14) comprises a semi-conductive material, and wherein the high voltage supply path (16) includes a high resistance (18) near the discharge electrode (14), and is electrically segregated from the paint supply path (12).

According to certain embodiments, the electrostatic atomizer (1000) can provide that the paint supply path (12) comprises an electrically insulating material. In some embodiments the electrostatic atomizer (1000) can provide that the discharge electrode (14) consists of a semi-conductive material, and the paint supply path consists of an electrically insulating material. In certain embodiments, the electrostatic atomizer (1000) can provide that the high voltage supply path (16) includes a metal part (20) on an upstream side of the high resistance (18), and wherein the metal part (20) does not include a paint supply system part (32) forming a part of the paint supply path (12). According to some embodiments, the electrostatic atomizer (1000) according to can provide that the paint supply path (12) includes a feed tube (30) connected to the paint discharge section (10), and wherein the feed tube (30) is made of an electrically insulating material. In some embodiments the electrostatic atomizer (1000) is configured such that the electrostatic atomizer (1000) is a rotary atomizing type electrostatic atomizer (1000), wherein the discharge electrode (14) is composed of a rotary atomizing head (1004) which is connected to an output shaft (1010) of an air motor (20) configured to drive the rotary atomizing head, and wherein the rotary atomizing head (1004) consists of a semi-conductive resin material. The electrostatic atomizer (1000) can provide that the air motor (20) is made of metal and constitutes a part of the high-voltage supply path (16). In some embodiments, the electrostatic atomizer (1000) can provide that the output shaft (1010) of the air motor (20) is made of an electrically insulating material and is hollow, and wherein the feed tube (30) is coaxially arranged in the hollow output shaft (1010). In certain embodiments, the electrostatic atomizer (1000) can be configured such that the paint supply path (12) includes a manifold (32) communicated with the feed tube (30), wherein a paint supply pipe (36) communicated with a paint source (34) and a solvent supply pipe (40) communicated with a solvent source (38) are connected to the manifold (32), and wherein the paint supply pipe (36) and the solvent supply pipe (40) are grounded through a bracket (1006). In some embodiments, the electrostatic atomizer (1000) can be configured such that the manifold (32) consists of an electrically insulating material. In some embodiments, the electrostatic atomizer (1000) can be arranged such that the paint supply pipe (36) and the solvent supply pipe (40) consist of an electrically insulating material. According to certain embodiments, the electrostatic atomizer (1000) can be configured such that the paint supply path (12) consists of an electrically insulating material. In some embodiments, electrostatic atomizer (1000) can provide that the high resistance (18) is supported by the hollow output shaft (1010). The electrostatic atomizer (1000) can further include an electrically insulating motor holder (24) for supporting the air motor (20) and having a hole for receiving a high-voltage cable (1002) forming a part of the high voltage supply path (16), and a cylindrical and electrically insulating member provided at an entrance of the hole of the motor holder (24), wherein the motor holder (24) has a cylindrical and electrically insulating member (24 *a*) at an entrance of a hole for receiving a high-voltage cable (1002), wherein the hole forms a portion of the high voltage supply path (16). In some embodiments, the electrostatic atomizer (1000) can be configured such that the high resistance (18) has a resistance value (R2) of 120 MW to 180 MW.

Figure 5:
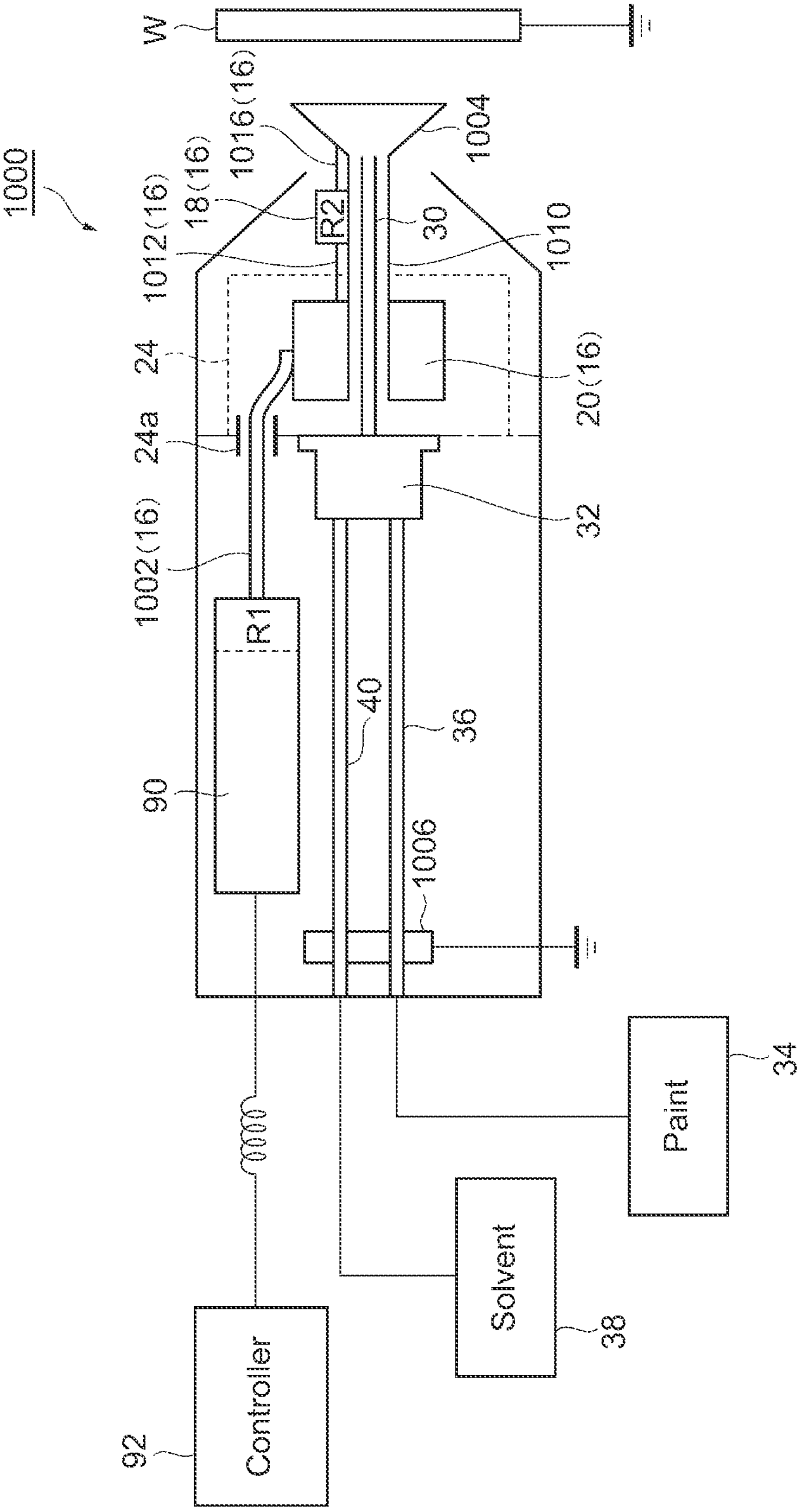
FIG. 5 is an example, non-limiting view of an electrostatic atomizer of the embodiments described herein.

FIG. 5 is an example, non-limiting view of an electrostatic atomizer of the embodiments described herein. As shown in FIG. 5, the electrostatic atomizer (1000) can be arranged such that the output shaft (1010) of the air motor (20) is made of an electrically insulating material and is hollow, and wherein the feed tube (30) is coaxially arranged in the hollow output shaft (1010). The electrostatic atomizer (1000) can be used to electrostatically coat a workpiece W, wherein the workpiece W is grounded. The workpiece W can be coated with a paint. The paint can comprise solvent borne metallics. In some embodiments, the electrostatic atomizer (1000) will avoid bridging with a solvent borne metallic paint at less than 50 mm from the workpiece W. In some embodiments, the electrostatic atomizer (1000) will avoid bridging at less than 40 mm between the bell cup (1004) and workpiece W. In some embodiments, the electrostatic atomizer (1000) will avoid bridging at less than 30 mm between the bell cup (1004) and workpiece W. An electrostatic atomizer (1000) can comprise a paint supply path (12) configured to supply paint to a paint discharge section (10); and a high voltage supply path (16) configured to supply a high voltage to a discharge electrode (14), wherein the discharge electrode (14) comprises a semi-conductive material, and wherein the high voltage supply path (16) includes a high resistance (18) near the discharge electrode (14), and is electrically segregated from the paint supply path (12). According to certain embodiments, the electrostatic atomizer (1000) can provide that the paint supply path (12) comprises an electrically insulating material. In some embodiments the electrostatic atomizer (1000) can provide that the discharge electrode (14) consists of a semi-conductive material, and the paint supply path consists of an electrically insulating material. In certain embodiments, the electrostatic atomizer (1000) can provide that the high voltage supply path (16) includes a metal part (20) on an upstream side of the high resistance (18), and wherein the metal part (20) does not include a paint supply system part (32) forming a part of the paint supply path (12). According to some embodiments, the electrostatic atomizer (1000) according to can provide that the paint supply path (12) includes a feed tube (30) connected to the paint discharge section (10), and wherein the feed tube (30) is made of an electrically insulating material.

In some embodiments the electrostatic atomizer (1000) is configured such that the electrostatic atomizer (1000) is a rotary atomizing type electrostatic atomizer (1000), wherein the discharge electrode (14) is composed of a rotary atomizing head (1004) which is connected to an output shaft (1010) of an air motor (20) configured to drive the rotary atomizing head, and wherein the rotary atomizing head (1004) consists of a semi-conductive resin material. The electrostatic atomizer (1000) can provide that the air motor (20) is made of metal and constitutes a part of the high-voltage supply path (16). In some embodiments, the electrostatic atomizer (1000) can provide that the output shaft (1010) of the air motor (20) is made of an electrically insulating material and is hollow, and wherein the feed tube (30) is coaxially arranged in the hollow output shaft (1010). In certain embodiments, the electrostatic atomizer (1000) can be configured such that the paint supply path (12) includes a manifold (32) communicated with the feed tube (30), wherein a paint supply pipe (36) communicated with a paint source (34) and a solvent supply pipe (40) communicated with a solvent source (38) are connected to the manifold (32), and wherein the paint supply pipe (36) and the solvent supply pipe (40) are grounded through a bracket (1006). In some embodiments, the electrostatic atomizer (1000) can be configured such that the manifold (32) consists of an electrically insulating material. In some embodiments, the electrostatic atomizer (1000) can be arranged such that the paint supply pipe (36) and the solvent supply pipe (40) consist of an electrically insulating material. According to certain embodiments, the electrostatic atomizer (1000) can be configured such that the paint supply path (12) consists of an electrically insulating material. In some embodiments, electrostatic atomizer (1000) can provide that the high resistance (18) is supported by the hollow output shaft (1010). The electrostatic atomizer (1000) can further include an electrically insulating motor holder (24) for supporting the air motor (20) and having a hole for receiving a high-voltage cable (1002) forming a part of the high voltage supply path (16), and a cylindrical and electrically insulating member provided at an entrance of the hole of the motor holder (24), wherein the motor holder (24) has a cylindrical and electrically insulating member (24 *a*) at an entrance of a hole for receiving a high-voltage cable (1002), wherein the hole forms a portion of the high voltage supply path (16). In some embodiments, the electrostatic atomizer (1000) can be configured such that the high resistance (18) has a resistance value (R2) of 120 MW to 180 MW.

Figure 6:
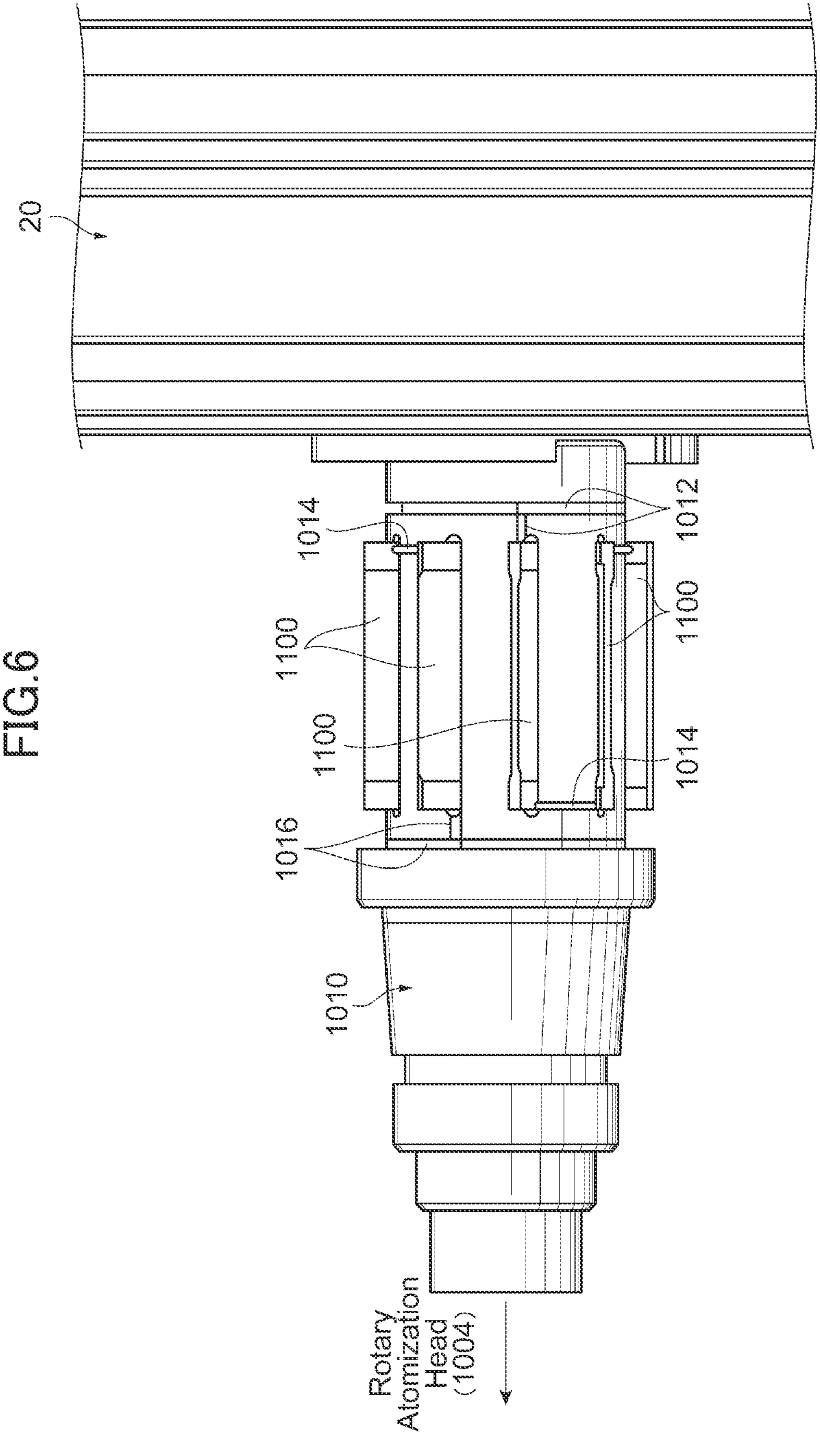
FIG. 6 is an example, non-limiting view of a portion of an electrostatic atomizer of the embodiments described herein.

FIG. 6 is an example, non-limiting view of a portion of an electrostatic atomizer of the embodiments described herein. The high resistance (R2) (18) can comprise, consist essentially of, or consist of a plurality of plate-shaped resistance elements (1100) connected in series with each other. The resistance elements (1100) can be supported by the output shaft (1010) of the air motor (20). A first plate-shaped resistor (1100) can be connected to the metal air motor (20) by the input lead wire (1012). The plurality of plate-shaped resistors (1100) are connected in series by conductive wires (1014). The last plate-shaped resistor (1100) can be connected to the rotary atomizing head, which can be a bell cup (1004) by an output lead wire (1016). An electrostatic atomizer (1000) can comprise a paint supply path (12) configured to supply paint to a paint discharge section (10), and a high voltage supply path (16) configured to supply a high voltage to a discharge electrode (14), wherein the discharge electrode (14) comprises a semi-conductive material, and wherein the high voltage supply path (16) includes a high resistance (18) near the discharge electrode (14), and is electrically segregated from the paint supply path (12).

According to certain embodiments, the electrostatic atomizer (1000) can provide that the paint supply path (12) comprises an electrically insulating material. In some embodiments the electrostatic atomizer (1000) can provide that the discharge electrode (14) consists of a semi-conductive material, and the paint supply path consists of an electrically insulating material. In certain embodiments, the electrostatic atomizer (1000) can provide that the high voltage supply path (16) includes a metal part (20) on an upstream side of the high resistance (18), and wherein the metal part (20) does not include a paint supply system part (32) forming a part of the paint supply path (12). According to some embodiments, the electrostatic atomizer (1000) according to can provide that the paint supply path (12) includes a feed tube (30) connected to the paint discharge section (10), and wherein the feed tube (30) is made of an electrically insulating material. In some embodiments the electrostatic atomizer (1000) is configured such that the electrostatic atomizer (1000) is a rotary atomizing type electrostatic atomizer (1000), wherein the discharge electrode (14) is composed of a rotary atomizing head (1004) which is connected to an output shaft (1010) of an air motor (20) configured to drive the rotary atomizing head, and wherein the rotary atomizing head (1004) consists of a semi-conductive resin material. The electrostatic atomizer (1000) can provide that the air motor (20) is made of metal and constitutes a part of the high-voltage supply path (16). In some embodiments, the electrostatic atomizer (1000) can provide that the output shaft (1010) of the air motor (20) is made of an electrically insulating material and is hollow, and wherein the feed tube (30) is coaxially arranged in the hollow output shaft (1010). In certain embodiments, the electrostatic atomizer (1000) can be configured such that the paint supply path (12) includes a manifold (32) communicated with the feed tube (30), wherein a paint supply pipe (36) communicated with a paint source (34) and a solvent supply pipe (40) communicated with a solvent source (38) are connected to the manifold (32), and wherein the paint supply pipe (36) and the solvent supply pipe (40) are grounded through a bracket (1006). In some embodiments, the electrostatic atomizer (1000) can be configured such that the manifold (32) consists of an electrically insulating material. In some embodiments, the electrostatic atomizer (1000) can be arranged such that the paint supply pipe (36) and the solvent supply pipe (40) consist of an electrically insulating material. According to certain embodiments, the electrostatic atomizer (1000) can be configured such that the paint supply path (12) consists of an electrically insulating material. In some embodiments, electrostatic atomizer (1000) can provide that the high resistance (18) is supported by the hollow output shaft (1010). The electrostatic atomizer (1000) can further include an electrically insulating motor holder (24) for supporting the air motor (20) and having a hole for receiving a high-voltage cable (1002) forming a part of the high voltage supply path (16), and a cylindrical and electrically insulating member provided at an entrance of the hole of the motor holder (24), wherein the motor holder (24) has a cylindrical and electrically insulating member (24 *a*) at an entrance of a hole for receiving a high-voltage cable (1002), wherein the hole forms a portion of the high voltage supply path (16). In some embodiments, the electrostatic atomizer (1000) can be configured such that the high resistance (18) has a resistance value (R2) of 120 MW to 180 MW.

Figure 7:
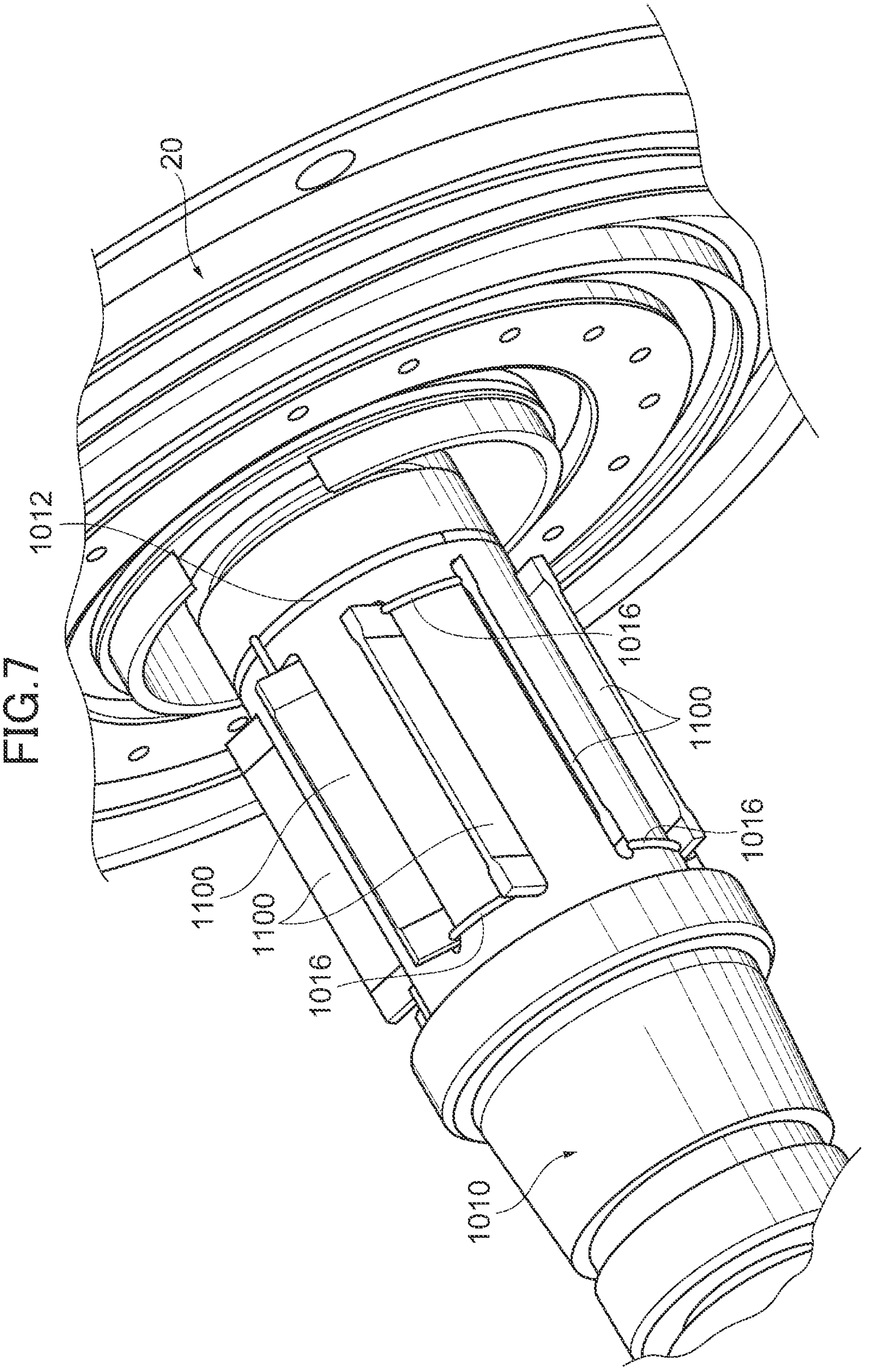
FIG. 7 is an example, non-limiting view of an electrostatic atomizer of the embodiments described herein.

FIG. 7 is an example, non-limiting view of a portion of an electrostatic atomizer of the embodiments described herein. The high resistance (R2) 18 can comprise, consist essentially of, or consist of a plurality of plate-shaped resistance elements (1100) connected in series with each other. The resistance elements (1100) can be supported by the output shaft (1010) of the air motor (20). A first plate-shaped resistor (1100) can be connected to the metal air motor (20) by the input lead wire (1012). The plurality of plate-shaped resistors (1100) are connected in series by conductive wires 1014.

The last plate-shaped resistor (1100) can be connected to the rotary atomizing head, which can be a bell cup (1004) by an output lead wire (1016). An electrostatic atomizer (1000) can comprise a paint supply path (12) configured to supply paint to a paint discharge section (10); and a high voltage supply path (16) configured to supply a high voltage to a discharge electrode (14), wherein the discharge electrode (14) comprises a semi-conductive material, and wherein the high voltage supply path (16) includes a high resistance (18) near the discharge electrode (14), and is electrically segregated from the paint supply path (12). According to certain embodiments, the electrostatic atomizer (1000) can provide that the paint supply path (12) comprises an electrically insulating material. In some embodiments the electrostatic atomizer (1000) can provide that the discharge electrode (14) consists of a semi-conductive material, and the paint supply path consists of an electrically insulating material. In certain embodiments, the electrostatic atomizer (1000) can provide that the high voltage supply path (16) includes a metal part (20) on an upstream side of the high resistance (18), and wherein the metal part (20) does not include a paint supply system part (32) forming a pan of the paint supply path (12). According to some embodiments, the electrostatic atomizer (1000) according to can provide that the paint supply path (12) includes a feed tube (30) connected to the paint discharge section (10), and wherein the feed tube (30) is made of an electrically insulating material. In some embodiments the electrostatic atomizer (1000) is configured such that the electrostatic atomizer (1000) is a rotary atomizing type electrostatic atomizer (1000), wherein the discharge electrode (14) is composed of a rotary atomizing head (1004) which is connected to an output shaft (1010) of an air motor (20) configured to drive the rotary atomizing head, and wherein the rotary atomizing head (1004) consists of a semi-conductive resin material. The electrostatic atomizer (1000) can provide that the air motor (20) is made of metal and constitutes a part of the high-voltage supply path (16). In some embodiments, the electrostatic atomizer (1000) can provide that the output shaft (1010) of the air motor (20) is made of an electrically insulating material and is hollow, and wherein the feed tube (30) is coaxially arranged in the hollow output shaft (1010). In certain embodiments, the electrostatic atomizer (1000) can be configured such that the paint supply path (12) includes a manifold (32) communicated with the feed tube (30), wherein a paint supply pipe (36) communicated with a paint source (34) and a solvent supply pipe (40) communicated with a solvent source (38) are connected to the manifold (32), and wherein the paint supply pipe (36) and the solvent supply pipe (40) are grounded through a bracket (1006).

In some embodiments, the electrostatic atomizer (1000) can be configured such that the manifold (32) consists of an electrically insulating material. In some embodiments, the electrostatic atomizer (1000) can be arranged such that the paint supply pipe (36) and the solvent supply pipe (40) consist of an electrically insulating material. According to certain embodiments, the electrostatic atomizer (1000) can be configured such that the paint supply path (12) consists of an electrically insulating material. In some embodiments, electrostatic atomizer (1000) can provide that the high resistance (18) is supported by the hollow output shaft (1010). The electrostatic atomizer (1000) can further include an electrically insulating motor holder (24) for supporting the air motor (20) and having a hole for receiving a high-voltage cable (1002) forming a part of the high voltage supply path (16), and a cylindrical and electrically insulating member provided at an entrance of the hole of the motor holder (24), wherein the motor holder (24) has a cylindrical and electrically insulating member (24 *a*) at an entrance of a hole for receiving a high-voltage cable (1002), wherein the hole forms a portion of the high voltage supply path (16). In some embodiments, the electrostatic atomizer (1000) can be configured such that the high resistance (18) has a resistance value (R2) of 120 MW to 180 MW.

Figure 8:
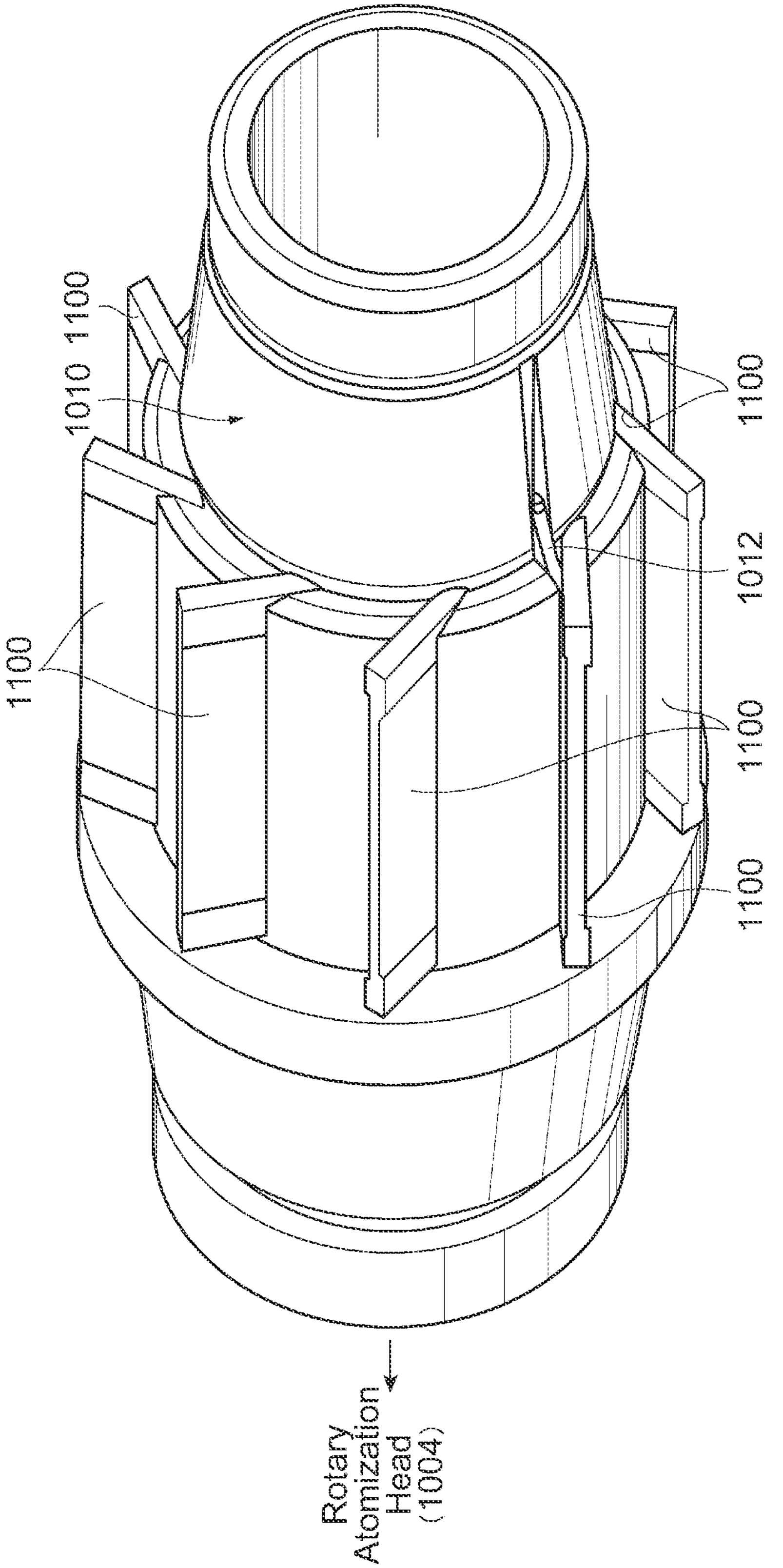
FIG. 8 is an example non-limiting view of a portion of an electrostatic atomizer of the embodiments described herein.

FIG. 8 is an example, non-limiting view of a portion of an electrostatic atomizer of the embodiments described herein. The high resistance (R2) 18 can comprise, consist essentially of, or consist of a plurality of plate-shaped resistance elements (1100) connected in series with each other. The resistance elements (1100) can be supported by the output shaft (1010) of the air motor (20). A first plate-shaped resistor (1100) can be connected to the metal air motor (20) by the input lead wire (1012). The plurality of plate-shaped resistors (1100) are connected in series by conductive wires 1014. The last plate-shaped resistor (1100) can be connected to the rotary atomizing head, which can be a bell cup (1004) by an output lead wire (1016). An electrostatic atomizer (1000) can comprise a paint supply path (12) configured to supply paint to a paint discharge section (10); and a high voltage supply path (16) configured to supply a high voltage to a discharge electrode (14), wherein the discharge electrode (14) comprises a semi-conductive material, and wherein the high voltage supply path (16) includes a high resistance (18) near the discharge electrode (14), and is electrically segregated from the paint supply path (12). According to certain embodiments, the electrostatic atomizer (1000) can provide that the paint supply path (12) comprises an electrically insulating material. In some embodiments the electrostatic atomizer (1000) can provide that the discharge electrode (14) consists of a semi-conductive material, and the paint supply path consists of an electrically insulating material. In certain embodiments, the electrostatic atomizer (1000) can provide that the high voltage supply path (16) includes a metal part (20) on an upstream side of the high resistance (18), and wherein the metal part (20) does not include a paint supply system part (32) forming a part of the paint supply path (12). According to some embodiments, the electrostatic atomizer (1000) according to can provide that the paint supply path (12) includes a feed tube (30) connected to the paint discharge section (10), and wherein the feed tube (30) is made of an electrically insulating material. In some embodiments the electrostatic atomizer (1000) is configured such that the electrostatic atomizer (1000) is a rotary atomizing type electrostatic atomizer (1000), wherein the discharge electrode (14) is composed of a rotary atomizing head (1004) which is connected to an output shaft (1010) of an air motor (20) configured to drive the rotary atomizing head, and wherein the rotary atomizing head (1004) consists of a semi-conductive resin material. The electrostatic atomizer (1000) can provide that the air motor (20) is made of metal and constitutes a part of the high-voltage supply path (16). In some embodiments, the electrostatic atomizer (1000) can provide that the output shaft (1010) of the air motor (20) is made of an electrically insulating material and is hollow, and wherein the feed tube (30) is coaxially arranged in the hollow output shaft (1010). In certain embodiments, the electrostatic atomizer (1000) can be configured such that the paint supply path (12) includes a manifold (32) communicated with the feed tube (30), wherein a paint supply pipe (36) communicated with a paint source (34) and a solvent supply pipe (40) communicated with a solvent source (38) are connected to the manifold (32), and wherein the paint supply pipe (36) and the solvent supply pipe (40) are grounded through a bracket (1006). In some embodiments, the electrostatic atomizer (1000) can be configured such that the manifold (32) consists of an electrically insulating material. In some embodiments, the electrostatic atomizer (1000) can be arranged such that the paint supply pipe (36) and the solvent supply pipe (40) consist of an electrically insulating material. According to certain embodiments, the electrostatic atomizer (1000) can be configured such that the paint supply path (12) consists of an electrically insulating material. In some embodiments, electrostatic atomizer (1000) can provide that the high resistance (18) is supported by the hollow output shaft (1010). The electrostatic atomizer (1000) can further include an electrically 5 insulating motor holder (24) for supporting the air motor (20) and having a hole for receiving a high-voltage cable (1002) forming a part of the high voltage supply path (16), and a cylindrical and electrically insulating member provided at an entrance of the hole of the motor holder (24), wherein the motor holder (24) has a cylindrical and electrically insulating member (24 *a*) at an entrance of a hole for receiving a high-voltage cable (1002), wherein the hole forms a portion of the high voltage supply path (16). In some embodiments, the electrostatic atomizer (1000) can be configured such that the high resistance (18) has a resistance value (R2) of 120 MW to 180 MW.

An electrostatic atomizer (1000) can comprise a paint supply path (12) configured to supply paint to a paint discharge section (10); and a high voltage supply path (16) configured to supply a high voltage to a discharge electrode (14), wherein the discharge electrode comprises a semi-conductive material, and wherein the high voltage supply path (16) includes a high resistance (18) near the discharge electrode (14), and is electrically segregated from the paint supply path (12). According to certain embodiments, the electrostatic atomizer (1000) can provide that the paint supply path (12) comprises an electrically insulating material. In some embodiments the electrostatic atomizer can provide that the discharge electrode consists of a semi-conductive material, and the paint supply path consists of an electrically insulating material. In certain embodiments, the electrostatic atomizer (1000) can provide that the high voltage supply path (16) includes a metal part (20) on an upstream side of the high resistance (18), and wherein the metal part (20) does not include a paint supply system part (32) forming a part of the paint supply path (12). According to some embodiments, the electrostatic atomizer (1000) according to can provide that the paint supply path (12) includes a feed tube (30) connected to the paint discharge section (10), and wherein the feed tube (30) is made of an electrically insulating material in some embodiments the electrostatic atomizer (1000) is configured such that the electrostatic atomizer is a rotary atomizing type electrostatic atomizer, wherein the discharge electrode (14) is composed of a rotary atomizing head (1004) which is connected to an output shaft (1010) of an air motor (20) configured to drive the rotary atomizing head, and wherein the rotary atomizing head (1004) consists of a semi-conductive resin material. The electrostatic atomizer (1000) can provide that the air motor (20) is made of metal and constitutes a part of the high-voltage supply path (16). In some embodiments, the electrostatic atomizer (1000) can provide that the output shaft (1010) of the air motor (20) is made of an electrically insulating material and is hollow, and wherein the feed tube (30) is coaxially arranged in the hollow output shaft (1010). In certain embodiments, the electrostatic atomizer (1000) can be configured such that the paint supply path (12) includes a manifold (32) communicated with the feed tube (30), wherein a paint supply pipe (36) communicated with a paint source (34) and a solvent supply pipe (40) communicated with a solvent source (38) are connected to the manifold (32), and wherein the paint supply pipe (36) and the solvent supply pipe (40) are grounded through a bracket (1006). In some embodiments, the electrostatic atomizer (1000) can be configured such that the manifold (32) consists of an electrically insulating material. In some embodiments, the electrostatic atomizer (1000) can be arranged such that the paint supply pipe (36) and the solvent supply pipe (40) consist of an electrically insulating material. According to certain embodiments, the electrostatic atomizer (1000) can be configured such that the paint supply path (12) consists of an electrically insulating material. In some embodiments, electrostatic atomizer can provide that the high resistance (18) is supported by the hollow output shaft (1010). The electrostatic atomizer (1000) can further include an electrically insulating motor holder (24) for supporting the air motor (20) and having a hole for receiving a high-voltage cable (1002) forming a part of the high voltage supply path (16), and a cylindrical and electrically insulating member provided at an entrance of the hole of the motor holder (24), wherein the motor holder (24) has a cylindrical and electrically insulating member (24 *a*) at an entrance of a hole for receiving a high-voltage cable (1002), wherein the hole forms a portion of the high voltage supply path (16). In some embodiments, the electrostatic atomizer (1000) can be configured such that the high resistance (18) has a resistance value (R2) of 120 MW to 180 MW.

The high voltage supply path 16 can have the following configuration: beginning at the cascade (90), directly to the high voltage cable (1002), directly to the air motor (20), wherein the air motor (20) consists of metal, directly to the input lead wire (1012), directly to the plate shaped resistance elements (1100), directly to the output lead wire (1016), directly to the rotating atomizing head (1004), which can be a bell.

The metal air motor (20) can be held by the motor holder (24), which can comprise, consist essentially of, or consist of an electrically insulating resin. The motor holder (24) can have a hole for receiving the high-voltage cable (1002), and at the entrance of the hole, a tubular and electrically insulating member (24 *a*) can be provided. The tubular member (24 *a*) can cause a creepage distance of insulation to be extended.

The rotary atomizing head (1004) can comprise or consist of a semi-conductive resin. The air motor (20) can comprise or consist of any electrically conductive metal. The motor holder (24) can comprise or consist of an electrically insulating resin. The output shaft (1010), which can be hollow, can comprise or consist of polyether ether ketone (PEEK) resin. The manifold (32) can comprise or consist of an electrically insulating resin. Pipes (36, 40) can comprise or consist of an electrically insulating resin tube. The feed tube (112) can comprise or consist of an electrically insulating resin. The resistance provided by R2 (18) can be between 120 MW to 180 MW.

EMBODIMENTS

In a first embodiment, provided is an electrostatic atomizer comprising a paint supply path configured to supply paint to a paint discharge section; and a high voltage supply path configured to supply a high voltage to a discharge electrode, wherein the discharge electrode comprises a semi-conductive material, and wherein the high voltage supply path includes a high resistance near the discharge electrode and is electrically segregated from the paint supply path.

The first or any subsequent embodiments may further provide that the paint supply path comprises an electrically insulating material.

The first or any previous or subsequent embodiments may further provide that the discharge electrode consists of a semi-conductive material, and wherein the paint supply path consists of an electrically insulating material.

The first or any previous or subsequent embodiments may further provide that the high voltage supply path includes a metal part on an upstream side of the high resistance, and wherein the metal part does not include a paint supply system part forming a part of the paint supply path.

The first or any previous or subsequent embodiments may further provide that the paint supply path includes a feed tube connected to the paint discharge section, and wherein the feed tube consists of an electrically insulating material.

The first or any previous or subsequent embodiments may further provide that the electrostatic atomizer is a rotary atomizing type electrostatic atomizer, wherein the discharge electrode is composed of a rotary atomizing head which is connected to an output shaft of an air motor configured to drive the rotary atomizing head, and wherein the rotary atomizing head consists of a semi-conductive resin material.

The first or any previous or subsequent embodiments may further provide that the air motor consists of metal and constitutes a part of the high-voltage supply path.

The first or any previous or subsequent embodiments may further provide that the output shaft of the air motor consists of an electrically insulating material and is hollow, and wherein the feed tube is coaxially arranged in the hollow output shaft.

The first or any previous or subsequent embodiments may further provide that the paint supply path includes a manifold communicated with the feed tube, wherein a paint supply pipe communicated with a paint source and a solvent supply pipe communicated with a solvent source are connected to the manifold, and wherein the paint supply pipe and the solvent supply pipe are grounded through a bracket.

The first or any previous or subsequent embodiments may further provide that the manifold consists of an electrically insulating material.

The first or any previous or subsequent embodiments may further provide that the paint supply pipe and the solvent supply pipe consist of an electrically insulating material.

The first or any previous or subsequent embodiments may further provide that the paint supply path consists of an electrically insulating material.

The first or any previous or subsequent embodiments may further provide that the high resistance is supported by the hollow output shaft.

The first or any previous or subsequent embodiments may further provide that the electrostatic atomizer comprises an electrically insulating motor holder for supporting the air motor and having a hole for receiving a high-voltage cable forming a part of the high voltage supply path, and a cylindrical and electrically insulating member provided at an entrance of the hole of the motor holder, wherein the motor holder has a cylindrical and electrically insulating member at an entrance of a hole for receiving a high-voltage cable, wherein the hole forms a portion of the high voltage supply path.

The first or any previous or subsequent embodiments may further provide that the high resistance has a resistance value of 120 MW to 180 MW.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims.

Moreover, unless specifically stated any use of the terms first, second, etc. do not denote any order or importance, but rather the terms first, second, etc. are used to distinguish one element from another.

We claim:

1. An electrostatic atomizer comprising:

a paint supply path configured to supply paint to a paint discharge section; and a high voltage supply path configured to supply a high voltage to a discharge electrode, wherein the discharge electrode comprises a semi-conductive material, wherein the high voltage supply path includes a high resistance near the discharge electrode and is electrically segregated from the paint supply path, wherein the paint supply path includes a manifold communicated with a feed tube, wherein the feed tube is connected to the paint discharge section, wherein the feed tube consists of an electrically insulating material, wherein the paint supply path consists of an electrically insulating material, wherein the paint supply path is grounded through a bracket, wherein the high voltage supply path includes a metal part on an upstream side of the high resistance, wherein the metal part does not include a paint supply system part forming a part of the paint supply path, wherein the paint supply path includes a feed tube connected to the paint discharge section, wherein the feed tube consists of an electrically insulating material;

wherein the electrostatic atomizer is a rotary atomizing type electrostatic atomizer, wherein the discharge electrode is composed of a rotary atomizing head which is connected to an output shaft of an air motor configured to drive the rotary atomizing head, wherein the rotary atomizing head consists of a semi-conductive resin material, wherein the air motor consists of metal and constitutes a part of the high-voltage supply path, wherein the output shaft of the air motor consists of an electrically insulating material and is hollow, and wherein the feed tube is coaxially arranged in the hollow output shaft, an electrically insulating motor holder for supporting the air motor and having a hole for receiving a high-voltage cable forming a part of the high voltage supply path, and a cylindrical and electrically insulating member provided at an entrance of the hole of the motor holder, wherein the motor holder has a cylindrical and electrically insulating member at an entrance of a hole for receiving a high-voltage cable, and wherein the hole forms a portion of the high voltage supply path.

2. The electrostatic atomizer according to claim 1, wherein the paint supply path includes the manifold communicated with the feed tube, wherein a paint supply pipe communicated with a paint source and a solvent supply pipe communicated with a solvent source are connected to the manifold, and wherein the paint supply pipe and the solvent supply pipe are grounded through the bracket.

3. The electrostatic atomizer according to claim 2, wherein the manifold consists of an electrically insulating material.

4. The electrostatic atomizer according to claim 3, wherein the paint supply pipe and the solvent supply pipe consist of an electrically insulating material.

5. The electrostatic atomizer according to claim 1, wherein the paint supply path consists of an electrically insulating material.

6. The electrostatic atomizer according to claim 1, wherein the high resistance is supported by the hollow output shaft.

7. The electrostatic atomizer according to claim 1, wherein the high resistance has a resistance value of 120 MW to 180 MW.

* * * * *